Sept. 16, 1924.
P. O. NOBLE
1,508,713
ARC WELDING APPARATUS
Filed March 24, 1923
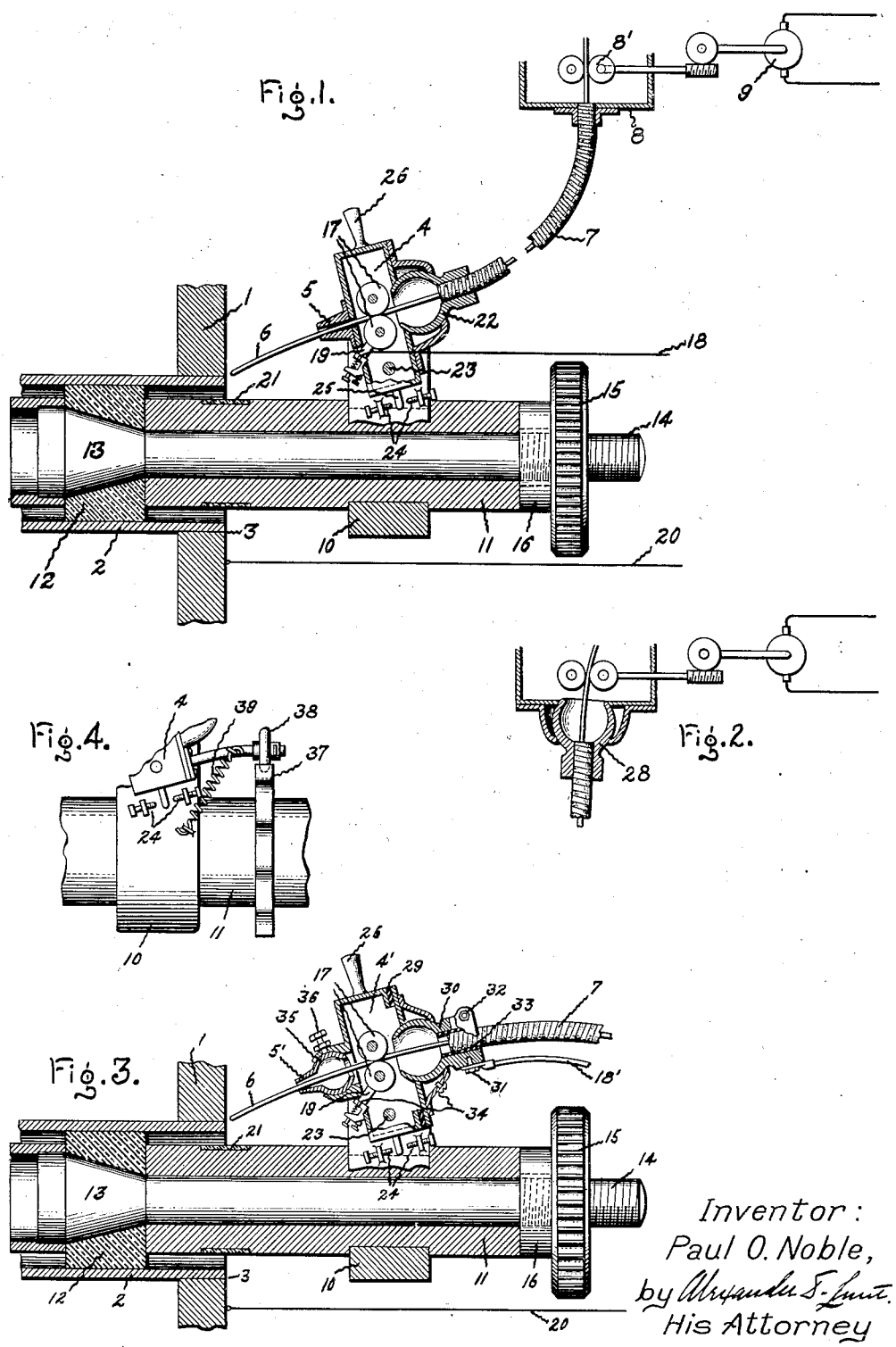
Inventor:
Paul O. Noble,
by (signature)
His Attorney Patented Sept. 16, 1924.

1,508,713

UNITED STATES PATENT OFFICE.

PAUL O. NOBLE, OF SCHENECTADY, NEW YORK, ASSIGNOR TO GENERAL ELECTRIC COMPANY, A CORPORATION OF NEW YORK.

ARC-WELDING APPARATUS.

Application filed March 24, 1923. Serial No. 627,487.

*To all whom it may concern:*

Be it known that I, PAUL O. NOBLE, a citizen of the United States, residing at Schenectady, in the county of Schenectady, State of New York, have invented certain new and useful Improvements in Arc-Welding Apparatus, of which the following is a specification.

My invention relates to electric arc welding and more particularly to an improved arrangement of apparatus for producing welds of circular character.

An object of my invention is to provide an apparatus whereby circular welds may be easily and quickly made by the automatic metallic arc welding process and particularly where the work to be welded is difficult of access and the available space too restricted to permit of automatic arc welding apparatus as commonly constructed.

The particular field in which my invention finds its greatest utility is in the automatic arc welding of boiler flues to the flue sheet.

Automatic arc welding systems of the type wherein the welding arc is maintained between the work and a metallic electrode drawn from a reel or other source of supply, and automatically and continuously fed to the arc at the proper rate to maintain the arc length substantially constant, are now well known. The rate of electrode feed in such systems is usually regulated in accordance with some characteristic of the arc which varies with the arc length such, for example, as the arc voltage or arc current. Such a system is disclosed in my copending application 323,170, filed Sept. 11, 1919, assigned to the assignee of my present application. A description of such apparatus also appears in British Patent No. 139,919 to the British Thomson Houston Company, Ltd.

My present application is a continuation in part of my copending application, Serial No. 487,875, filed July 27, 1921, assigned to the assignee of my present application. In that application I have disclosed and claimed broadly an arrangement which permits of the welding being done at a point some distance from the mechanism which automatically feeds the electrode to maintain the arc. To enable this to be done, I have disclosed in that application a flexible guiding means for guiding the electrode to the electrode-delivery device which may comprise a light, portable hand tool or a support upon which the electrode delivery device is mounted so that the arc may be made to travel along the joint which it is desired to weld. This arrangement enables me to secure all of the advantages of automatic control of the rate of electrode feed and yet disassociate the electrode feeding mechanism from the electrode delivery device. Since the electrode feeding mechanism together with the regulating and control apparatus customarily used therewith is comparatively large and bulky, my invention makes it possible to use automatic arc welding for classes of work for which the ordinary automatic arc welding machine cannot be used and for which it is difficult to design a satisfactory completely automatic machine in which the feeding mechanism and electrode delivery device are associated as a unit. The electrode guiding means preferably comprises a flexible guide tube constructed like an ordinary metallic steam hose through which the electrode is fed to the electrode delivery device which is provided with suitable means for leading the welding current into the electrode at the electrode delivery device, so that, while the flexible guide through which the electrode is fed may be a number of feet in length, the length of electrode carrying current is comparatively short. The welding current may be led to the electrode delivery device by an ordinary conductor or may be a flexible conductor braided upon the flexible electrode guide tube and suitably insulated therefrom. The control wires for controlling the starting and stopping of the electrode feeding mechanism may also be mounted on the flexible guide tube in a similar manner if desired.

My present invention utilizes this idea of means comprising a flexible guide for guiding the electrode to the electrode delivery device. The electrode delivery device is arranged for rotation to produce circular welds such as must be made in the welding of boiler flues to the flue sheet. It will be apparent, however, as the description proceeds, that my invention is not limited to making welds in exactly circular paths since the same problems are encountered in making any weld in a closed path or a path of generally circular character.

My invention will be better understood from the following description taken in connection with the accompanying drawing and its scope will be pointed out in the appended claims.

Referring to the accompanying drawing, Figs. 1 and 3 show embodiments of my invention particularly adapted for flue welding; Fig. 2 shows a detail of a modification and Fig. 4 shows how means may be provided for oscillating the electrode across the path of the weld.

Referring to Fig. 1, the boiler flue sheet is indicated by 1 and the tube 2 to be welded thereto projects through the flue sheet so that a circular weld may be made at 3. The electrode delivery device 4 is provided with suitable means, shown as a nozzle 5, through which the electrode 6 is delivered to the arc which, during welding, is maintained between said electrode and the joint to be welded. The electrode 6 is guided to the electrode delivery device 4 by the flexible guide tube 7 heretofore described. One end of this guide tube is secured to the electrode delivery device and the other end is secured in any suitable way so that the electrode may be fed into and through the tube from the electrode feeding mechanism. In the drawing the tube is indicated as secured to a member 8 which may be a part of the welding head in which the electrode feeding mechanism is incorporated or any other suitable support. The electrode feeding mechanism is represented as comprising electrode feed rolls 8' driven through suitable gearing from electrode feed motor 9 which may be connected across the arc so that the rate of electrode feed is varied in accordance with variations in the arc length to maintain the arc length substantially constant as heretofore described.

The electrode delivery device 4 is mounted for rotation so that the end of the electrode 6 during such rotation may produce welds of circular character. In the flue welding apparatus shown, the electrode delivery device is supported by and rotatable upon a support 11, a suitable bearing being provided between parts 10 and 11.

The support 11 may be secured in any desired manner in proper relation to the flue work to be welded. In the embodiment illustrated, the support is secured in the flue to be welded and the means for securing the support in the flue comprises insulating blocks 12 arranged in grooves in the member 11. These blocks are provided with tapered surfaces to cooperate with a correspondingly tapered surface 13 on the bolt 14. Upon turning up the nut 15 against the washer 16, bearing on the support 11, the blocks 12 are forced against the inner walls of the tube 2 and clamp the support for the electrode delivery device firmly in position. Since the electrode is connected to one side of the welding circuit and the flue sheet to the other side thereof, the electrode delivery device should be insulated from the flue sheet and this insulation is accomplished in the embodiment shown by the insulating blocks 12, although it will be obvious to those skilled in the art that such insulation might be secured in many other ways, as, for example, by insulating the electrode delivery device 4 from the support 11.

The electrode delivery device is provided with suitable means for leading the welding current into the electrode 6 and such means are represented in the drawing as comprising the rolls 17, one of which may be connected to the welding current conductor 18 through a brush 19 bearing on the roll or shaft thereof. The conductor 18 is connected to one terminal of a suitable source of welding current, the other terminal of which is connected to the conductor 20 which leads to flue sheet 1.

Upon rotation of the electrode delivery device about the support 11, the end of the electrode 6 will describe a circle on the line of the desired weld. The diameter of the weld is small in flue welding and the arc is therefore close to the support 11, which may be provided with suitable refractory means 21 to prevent damage to the support from the heat of the arc. As the electrode delivery device is turned about the support 11 there is a tendency to produce a torsion in or twisting of the electrode guide tube 7. To prevent such twisting, the guide tube is secured to the electrode delivery device by a joint 22 which permits relative rotation between the electrode delivery device and tube and this joint will preferably be of the ball and socket type. Turning of the electrode delivery device about the support will also twist conductor 18 and wrap the conductor 18 about the guide tube, but this is not a serious matter since successive welds may be made in opposite directions.

The electrode delivery device is pivoted at 23 upon the member 10 to permit the electrode 6 to be rocked away from and toward the line of the weld. Adjustable stops 24 are preferably provided upon the member 10 cooperating with a projection 25 from the device 4 to limit this rocking movement. As it is well known in the art, it is undesirable to start the arc in the line of the weld since a weak spot in the weld is thereby produced. The operator will, therefore, rock the device 4 by the handle 26 so that the arc will be started between the electrode and the flue sheet at one side of the joint to be welded after which the device will be rocked back into the line of the weld. The pivot 23 may be tightened so that the device 4 will stay in any position to which it is moved by the operator or if desired a spring may be provided for normally biasing the device to a position where the electrode is delivered to the line of the weld. The diameter of the weld may be adjusted to accommodate flues of different sizes by adjusting the device 4 about the pivot 23.

The electrode delivery device may be turned about the support 11 manually by the operator or any suitable automatic means may be provided for securing this turning motion. It is immaterial, as far as my invention is concerned, whether this rotation is secured manually or by means of a spring motor or other motor. Where automatic means are provided for rotating the electrode delivery device suitable stopping mechanism may be provided for stopping the rotation when a weld has been completed. When the weld has been completed, the electrode delivery device is preferably rocked to one side so that the arc will be broken at the side of the joint which has been welded. This is desirable for the reason that a crater is produced when the arc is broken, unless means are provided for reducing the welding current to a low value before the circuit is broken.

In the modification shown in Fig. 2, the joint 28 for permitting the tube to turn without twisting is shown at the other end of the tube.

Where the joint for preventing twisting of the tube is located at the point where the tube is attached to the electrode delivery device a ball and socket joint which permits universal adjustment is preferable to a joint which permits mere turning without universal adjustment, but where the joint is placed at the other end of the tube as shown in Fig. 2 the universal adjustment is not of so much importance and an ordinary joint for permitting relative turning motion may be used with practically equal facility unless the guide tube is quite short.

Since the support 11 for the electrode delivery device is insulated from the work by the insulating blocks 12, the conductor 18 which leads current to the electrode delivery device 4 may, if desired, be directly connected to the support 11. The welding current will then pass from the support 11 to the member 10 through the bearing and into the frame of the device 4 with which the contact rolls are in conducting engagement. As thus connected there will be no tendency to twist conductor 18, but the tendency of the guide tube 7 to wrap about the conductor 18 will still exist.

Fig. 3 shows a further embodiment of my invention in which means are provided for leading the welding current into the electrode delivery device in such a way that there is no tendency to twist either the electrode guide tube or the conductor which leads current into the electrode and no tendency to wrap the guide tube about the conductor. The electrode delivery device 4' is provided with suitable insulation 29 which insulates the fixed parts of the universal joint from the frame of the device 4'. The welding conductor 18' is secured to the sleeve 30 of the ball member of the ball and socket joint by suitable means indicated as a bolt 31. The sleeve 30 is slit and a clamping nut 32 provided for clamping the guide tube 7 in place. This same clamping arrangement will preferably be used in the modifications heretofore described. Insulation 33 is shown for insulating the sleeve 30 from the guide tube 7 which is preferably provided with a metallic armor to withstand abrasion. This insulation is desirable to prevent the metallic armor from being alive and will preferably be used in the modifications heretofore described. The welding current is led from the conductor 18' to the brush 19 which contacts with one of the rolls 17 by means of a flexible conductor 34 secured to the insulated part of the ball and socket joint fixed to the electrode delivery device 4'. The current thus passes from the conductor 18' through the contacting members of the ball and socket joint, through the lead 34 to the brush. It is thus apparent that the guide tube 7 and conductor 18' do not turn when the electrode delivery device 4' turns relatively to the guide tube and conductor.

The arrangement shown in Fig. 3 differs further from the arrangement in Fig. 1 in that the electrode delivery nozzle 5' is mounted in the device by a ball and socket joint 35 which permits the direction of delivery of the electrode to be adjusted to any desired angle. The nozzle 5' may be secured in any desired position of adjustment by a set-screw 36. It will be apparent that by adjusting the nozzle 5' in the plane of the adjustment of the device about the pivot 23, the diameter of the weld may be adjusted in addition to such adjustment as may be secured by adjustment about the pivot 23. It will also be apparent that by adjusting the nozzle 5' laterally, the angle at which the electrode is delivered to the work may be adjusted so as to deliver the electrode perpendicularly to a line tangential to the line of the weld or at an angle thereto. In other words, the electrode may be made to lead or trail with any desired angle of inclination with respect to the work.

Where it is found desirable to oscillate the electrode across the line of the joint as the weld is being made, the arrangement of Fig. 4 may be provided in the arrangements shown in Figs. 1 and 2. In the embodiment illustrated in Fig. 4, a cam 37 is mounted upon the support 11 and the cam-follower represented as a roller 38 is secured to the frame 4 and held against the cam by suitable spring means 39. As thus arranged, the rotation of the member 10 about the support causes the cam to impart an oscillating or rocking motion to the electrode delivery device 4 thereby causing the tip of the electrode 6 to oscillate transversely to the line of the weld. When arranged for this oscillatory movement the stops 24 will be adjusted so as to permit free movement of the electrode delivery device. When it is not desired to use the oscillating mechanism, the cam 37 may be moved back on the support 11 so as to be out of contact with the cam follower or if desired the cam may be left in place and the cam follower removed and the spring 39 disconnected. The stops 24 may then be adjusted to permit of the operation hereinbefore described in connection with Fig. 1.

I have explained my invention by illustrating and particularly describing certain embodiments thereof but it will be readily understood by those skilled in the art that the invention may be embodied in many other forms than those shown and described. I accordingly do not wish to be restricted to the particular form or construction disclosed herein by way of example for the purpose of setting forth my invention in accordance with patent statutes. The terms of the following claims are, therefore, intended to cover all changes and modification within the spirit of my invention.

What I claim as new and desire to secure by Letters Patent of the United States, is:—

1. An arc welding apparatus comprising in combination an electrode delivery device, means adapted to feed an electrode continuously to said device, a flexible guide tube arranged to guide the electrode from said feeding means to said device, a support for said device, means whereby said device may be turned about said support and means whereby said device may be thus turned without twisting said tube.

2. An arc welding apparatus comprising in combination an electrode delivery device, a flexible tube for guiding a welding electrode to said device, means for feeding the electrode through said tube to said device, means for supporting said device arranged to permit movement thereof in a circular path and means to prevent twisting of said tube by such circular movement.

3. An arc welding apparatus wherein a continuous metallic electrode is fed from a source of supply to the welding arc and wherein means are provided for automatically feeding the electrode to maintain the arc, comprising in combination an electrode delivery device, means for guiding the electrode from said feeding means to said device, means whereby said device may be moved about an axis to produce welds of circular character and means permitting said device to be thus moved without twisting said electrode guiding means.

4. An arc welding apparatus of the type wherein means are provided for automatically feeding a continuous metallic electrode to maintain the arc, comprising in combination an electrode delivery device mounted for movement in a closed path, a flexible guide tube one end of which is secured to said device for guiding the electrode to said device, and means whereby movement of said device in said closed path may be effected without twisting said guide tube.

5. An arc welding apparatus of the type wherein means are provided for feeding a continuous metallic electrode to maintain the arc comprising in combination an electrode delivery device adapted to be rotated, electrode guiding means secured to said device for guiding the electrode from said feeding means to said device and a ball and socket joint at one end of said electrode guiding means to permit rotation of said device without twisting said guiding means.

6. An arc welding apparatus comprising in combination means for feeding a continuous metallic electrode to maintain the arc, a support, an electrode delivery device mounted on said support and rotatable to produce welds of circular character, a flexible guide tube secured to said device for guiding the electrode from said feeding means to said device and means on said device for leading current into the electrode as it is fed therethrough.

7. In an arc welding apparatus of the class described a support, an electrode delivery device rotatably mounted on said support whereby welds of a circular character may be made, a flexible guide tube for guiding the electrode to said device and a universal joint for securing said guide tube to said device whereby said device may be rotated without twisting said tube.

8. An arc welding apparatus comprising in combination an electrode delivery device, a guide for guiding a welding electrode to said delivery device, a conductor for leading welding current to the electrode at said delivery device, a joint between said guide and delivery device arranged to permit said delivery device to rotate relatively to said guide and means for leading welding current into the electrode at said delivery device connected to said conductor through said joint whereby said electrode delivery device may be rotated without turning said guide and conductor.

9. In an arc welding apparatus of the type wherein a continuous metallic electrode is fed to the arc to maintain the same, a support, a member rotatable on said support, an electrode delivery device through which the electrode is fed to the arc mounted on said member, whereby circular welds may be made upon rotation of said member upon said support, said electrode delivery device comprising a nozzle secured thereto by a joint of the universal type, whereby said nozzle may be adjusted to vary the inclination of the electrode with respect to the work.

10. In an arc welding apparatus of the class described a support, an electrode delivery device rotatably mounted on said support whereby welds of a circular character may be made and means for oscillating said electrode delivery device comprising a cam on said support and a follower arranged to actuate said device.

11. In an arc welding apparatus of the class described a support, a member rotatably mounted on said support, an electrode delivery device pivotally mounted upon said member and means for oscillating said device upon said pivot upon rotation of said member on said support.

In witness whereof, I have hereunto set my hand this 23rd day of March, 1923.

PAUL O. NOBLE.